Figure 1:
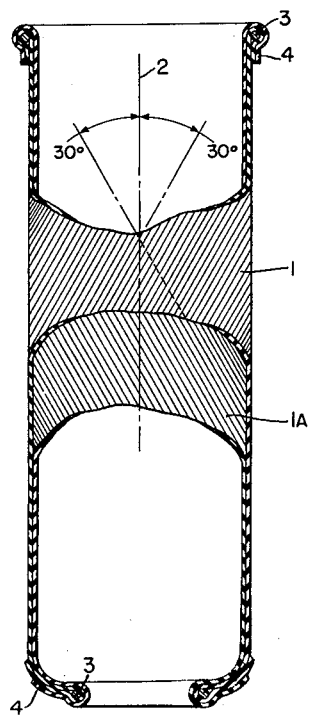

July 10, 1962 A. B. HIRTREITER 3,043,582
ROLLING LOBE TYPE AIR SPRING AND METHOD OF MANUFACTURE
Filed Oct. 2, 1956 2 Sheets-Sheet 1

*INVENTOR.*
ARTHUR B. HIRTREITER
BY
*ATTORNEY*

July 10, 1962   A. B. HIRTREITER   3,043,582
ROLLING LOBE TYPE AIR SPRING AND METHOD OF MANUFACTURE
Filed Oct. 2, 1956   2 Sheets-Sheet 2

INVENTOR.
ARTHUR B. HIRTREITER
BY
R. L. Miller
ATTORNEY

United States Patent Office 3,043,582
Patented July 10, 1962

3,043,582
ROLLING LOBE TYPE AIR SPRING AND METHOD OF MANUFACTURE
Arthur B. Hirtreiter, Akron, Ohio, assignor to The Goodyear Tire & Rubber Company, Akron, Ohio, a corporation of Ohio
Filed Oct. 2, 1956, Ser. No. 613,531
17 Claims. (Cl. 267—65)

The present invention relates to air springs and particularly to air springs of the rolling-lobe type, as distinguished from the regular lobe type of spring which is of generally accordion shape at its outer surface or corrugated to produce a series of rounded lobes which, in the compression and expansion of the spring, tend to increase and decrease in diameter, thereby changing the effective area within the spring upon which the load acts.

One object of this invention is to provide an air spring which has a controlled outer diameter established by the construction of the spring itself and does not rely upon separate external means for controlling that diameter. Specifically, the invention resides in providing a spring of this character which is manufactured with cords arranged at predetermined angles with reference to an element of a generally cylindrical surface.

More specifically, by designing an air spring in which the outer diameter thereof will remain constant during operation, any lateral support for the outer surface of the spring is eliminated and friction is reduced by eliminating this outer support. Also the danger of abrasion of the fabric of the spring is reduced, because foreign matter accumulating on the outside of the fabric does not come between the fabric and a lateral support which is sometimes provided in springs of this character. With a spring of the character to be described, substantially the only resistance to its operation is the amount of internal friction which may develop within the material of the spring itself, and this is relatively small.

Another object of this invention is to improve the the normal ride of an automobile or the like so that, in the normal range of deflections for relatively smooth roads, the spring will be relatively soft, the softness to be determined by design of the spring.

A specific object of this invention is to control the spring rate so that during normal driving the spring will be relatively soft to give easy riding, and during the movement of the spring to extreme positions the pressure within the spring may be controlled to any degree desired by a car manufacturer without changing the construction of the flexible wall of the spring. Particularly, this invention relates to controlling the normal driving range, the jounce and the rebound by the shape of a piston with which the flexible wall of the spring is associated.

Applicant controls the effective cross section of the spring by using the same flexible chamber and a properly shaped piston operating at one or both ends of the air spring.

Another object of this invention is to provide an air spring with a free floating bead reinforcement at each end, that is a bead which is free of the fabric and rubber surrounding the same, so that the fabric and the rubber can rotate around the spring when the spring is mounted in position, and without putting undue stress in the rubber or fabric. Once mounted and under load this bead and associated rubber and fabric parts adjacent it remain substantially in fixed relation with respect to each other, so that there is little if any friction developed between the two in the normal operation of the spring. This is because of the fact that the ends of the spring are so mounted that the beaded edges thereof remain constantly in the same position under normal riding conditions, although this does not mean that under extreme conditions there will not be some rotation. In order to further assure that there will be no wear occurring between the solid bead and the surrounding rubber and fabric, it is within the scope of this invention to provide a lubricant therebetween which can be applied at the time of manufacture.

Figure 2:
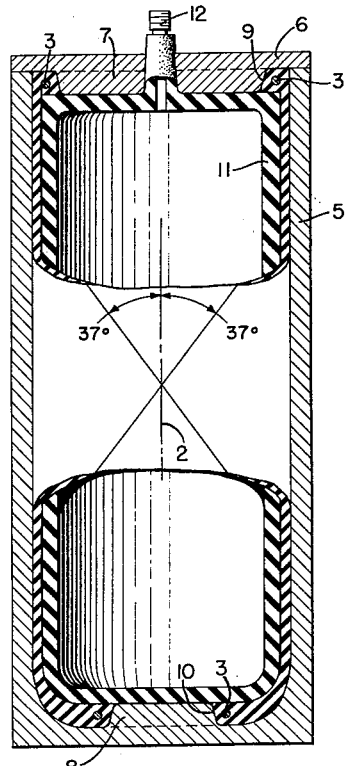
Figure 3:
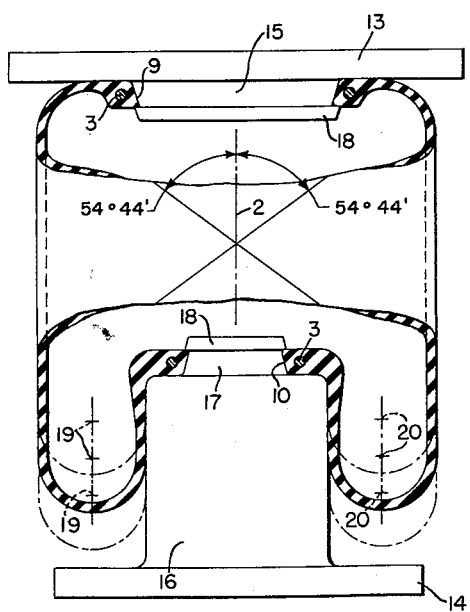
Figure 8:
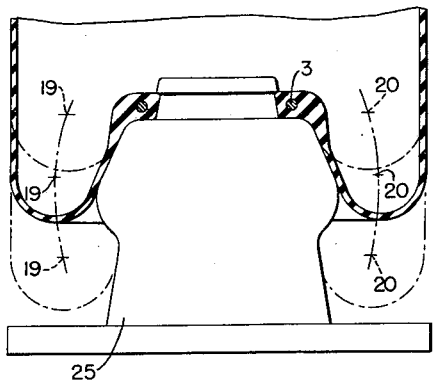
Figure 9:
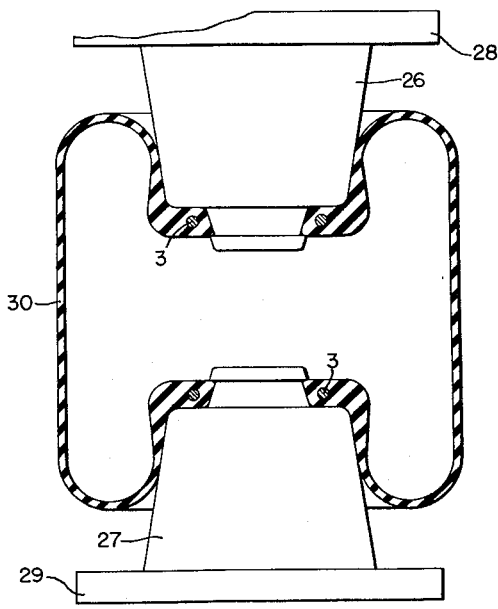

In the drawings:
FIG. 1 is a partial cross-sectional view illustrating the construction of the spring in the first step of manufacture;
FIG. 2 is a cross-sectional view of the molding apparatus and shows the step of molding the spring to final contour;
FIG. 3 is a cross-sectional view through one form of the spring in loaded condition;
FIGS. 4, 5, 6, 7 and 8 are views similar to FIG. 3 showing modifications of the cylinder illustrated in FIG. 3; and
FIG. 9 shows a further modification.

Essentially, the air spring comprises a substantially tubular wall made of a plurality of layers of cord fabric formed with beads at the opposite ends thereof to provide mounting means for mounting the ends on rigid end plates to form an air receiving chamber. The cords in the tubular wall are arranged at an angle substantially less than the angle of equilibrium when the wall is not under load as in FIG. 2, but at angles which, when the spring is inflated to operational pressure and under axial load, will be altered to the extent that they will be at what is referred to herein as the "angle of equilibrium." This angle of equilibrium for a tubular wall under inflation but not under axial load is well understood in the art as being an angle of 54°44′. It is the maximum angle beyond which a cord will not move when such a tubular article is subjected to internal pressure. In hose, where it is desired that the hose be made inexpansible, such as in hydraulic hose used on hydraulic brake systems, the cords are built into the hose at an angle of 54°44′, for the purpose of limiting the expansion of the hose, so that pressure on the brake will not expand the hose and absorb some of the pressure intended for the brakes themselves.

In the present instance, this angle is used to denote the maximum angle to which the cylindrical body of the spring may expand under pressure and load to determine the outer dimension thereof and to maintain the outer surface of the spring substantially cylindrical throughout the major portion of its length. Thus, if the outer diameter of the spring is calculated for the load to be carried, it is possible to design the spring by providing an initial cord angle which, when the spring is expanded, will cause the cord angle to increase to at least approximately the angle of equilibrium under normal operating conditions for the spring, but permit the cords near the ends to remain at smaller angles. By thus maintaining the outer diameter fixed during operation of the spring in all positions, the effective cross sectional area upon which the air pressure acts will remain constant if desired or which may be controlled by a piston to the desired extent in a manner which will be described more fully hereinafter. It is immaterial what the angle of equilibrium is since it is only important to know that there is an angle of equilibrium which establishes an outer cylindrical wall for the spring at its mid-section.

Previous to this invention, known devices have employed restraining elements exteriorly of the flexible tubular wall to prevent expansion beyond a certain diameter. Such means have generally comprised cylindrical rigid walls embracing the tubular flexible wall. The present invention avoids the use of such a separate element and yet by the construction of the spring the necessary control of the outside diameter for the purposes of this invention is made possible.

For the sake of the description and not to be considered as limiting as far as the invention is concerned, the invention shown in FIGS. 1, 2 and 3 will be described as applied to an air spring in which the maximum diameter under load is 7″. In order to produce a spring having such characteristics, a tubular member such as shown in FIG. 1 is constructed of cord fabric and as illustrated comprises two layers 1 and 1a which have cords extending at equal but opposite angles to an element 2 of the surface. This term "element" as herein used means an imaginary line extending longitudinally of the tubular wall and which would be formed by a plane through the axis of the tubular wall and intersecting the surface thereof. All cord angles hereinafter referred to are measured from this element.

The two layers of cord 1 and 1a may be built on a cylindrical drum and the edges of the layers wrapped about inextensible beads 3 as illustrated at 4, similar to the manner in which beads are tied into the cords of an automobile tire in building the carcass therefor. For a 7″ maximum outer diameter as shown in FIG. 3, the fabric originally is wrapped about a drum of 3⅜″ diameter with the cords arranged at an angle of 30°. This flexible wall is then placed in a mold 5 having a cover 6, with the beads 3 at the upper and lower ends of the tubular wall centered about the bosses 7 and 8 respectively at the top and bottom of the mold. These bosses are bevelled as at 9 and 10, so as to produce sloping seats on the beaded edges of the tubular wall, the angle of bevel being preferably in the order of 5 to 15° and sloping in a general direction inwardly and axially of the tubular wall as shown. An expansible air bag 11 having an inflation valve 12 of any description is placed within the tubular wall and air is introduced into the air bag under sufficient pressure to expand the tubular wall until it engages the walls of the mold. This removes the slack from the cords and insures that each cord will take its fair share of the load in the ultimate structure. The inner wall of the mold for a 7″ spring should be about 4½″ inside diameter. After vulcanization the tubular wall will have the shape shown in FIG. 2. During this expansion it will be noted that, since the beads 3 at the upper end of the tubular member are inextensible, the molded beaded edges do not expand and instead of being at the outside of the tubular wall as in FIG. 1 they are now on the inside of the tubular wall as illustrated in FIG. 2. Also, during this expansion of the tubular wall the cords at the longitudinal mid-section change their angles to approximately 37° and this is the uninflated and unloaded angle for the cords in the sleeve.

The spring structure when under load is shown best in FIG. 3. There the tubular wall is shown mounted between end plates 13 and 14. The upper plate 13 has a cylindrical boss 15 provided with a bevelled edge forming a seat on which the upper bead 3 of the spring is seated. The lower plate 14 is provided with a cylinder 16 mounted thereon, either permanently or detachably, and the upper end of this cylinder is provided with a boss 17 having a bevelled seat for mounting the lower beads 3 of the tubular wall. The bosses 15 and 17 form end walls closing the ends of the tubular wall and these are each provided with an enlarged flange 18 which is just slightly larger than the adjacent boss to provide a retaining shoulder which will engage the mounted beads to prevent their accidental dislodgment upon an extension of the spring beyond normal operating ranges. The retaining force of these flanges does not interfere with the mounting and dismounting of the beads on the bosses, and in some instances these flanges may be found to be unnecessary. The fit of the beads 3 on their respective bosses is such that the surfaces of the beads will be somewhat compressed to effect a good air seal between end walls formed by the bosses 15 and 17 and the beads of the tubular wall to thus provide a closed air chamber comprising the tubular wall and end walls.

In the form of the invention illustrated, the inflating means for the spring is not shown, but such means is normally well understood in the art and normally comprises a suitable valve communicating with a passage leading through one of the end walls. Such inflation means is also connected with and forms a part of the fluid system which controls the action of the spring.

Normally, such springs are operated entirely with air under pressure as the fluid medium, but it is within the scope of this invention to employ a fluid system in which the fluid is a liquid in part and air or a compressible gas in part. For example, the fluid could entirely fill the spring and lead through a passage in one of the end walls to an air chamber which would permit the controlled loading of the spring. However, in the preferred form of the invention the spring will employ only air or gas under pressure and it may be connected or not to a separate reserve air chamber. Usually, such reserve air chambers are provided to give the extra volume required, so that the spring will give a softer ride. In other words, instead of constructing a larger air chamber of flexible material and end walls as shown in FIG. 3, a smaller chamber may be used and an auxiliary chamber connected thereto. Such a combination between an air spring itself and reserve air chamber is well understood in the art and forms no part of the present invention.

It will be noted in FIG. 3, which illustrates a loaded condition for the spring, that the tubular member is expanded to its maximum diameter, which is 7″ in the illustrated embodiment. Except adjacent the ends where the air pressure in the spring and the beads restrict portions of the tubular wall in a manner to be described presently, the cords lie at the angle of equilibrium or substantially so. However, due to the fact that the rubber in the fabric layers tends to resist the pantographing of the cords, the inflated angle of equilibrium is never quite reached, but is in close approximation thereto, and actually reaches an angle in the order of 53 to 54°. This is the practical angle of equilibrium and limits the expansion beyond this point. Whether it is the actual angle of equilibrium or the practical angle of equilibrium is immaterial as long as the cords reach a final position of equilibrium so that the outer diameter of the tubular wall is determined and will not change during operation. The critical feature of the invention is that when inflated and under load the mid-section has an outer diameter which remains constant for all practical purposes during the movement of the pistons toward and from each other during operation of the spring.

Further reference to FIG. 3 shows that the lower end of the tubular wall extends from the lower cylindrical portion inwardly in an arc to a position adjacent the cylinder 16 and then follows the contour of the cylinder. The cords in this portion of the wall of course have an intermediate angle and the air pressure within the tubular wall holds the lower end of the tubular wall in the shape illustrated in FIG. 3 at all times during the operation of the spring. This condition is not easily explained, except to the extent that the natural tendency of the tubular sleeve is to remain at its molded diameter which is that of the cylinder 16 or approximately so and, therefore, as the load compresses the spring the portions of the cords in the looped areas progressively change their angles to restrict the diameter so that it tends to hug the cylinder 16 during all positions of the spring.

There is a distinct purpose in molding the cylindrical spring to the diameter shown in FIG. 2 which is substantially less than the ultimate diameter as shown in FIG. 3 but substantially greater than the diameter of the spring when first shaped as in FIG. 1. Note from an inspection of FIG. 3 that as the spring is deflected under load portions of the cords at the ends of the cylindrical section move into the lobes and then ultimately into a position where they are lying against the piston 16. By using a molded diameter as in FIG. 2, then when the spring is pressurized and under axial load the cords in the lobes pantograph from their vulcanized positions in the rubber to greater and lesser angles during spring operation. If the spring were molded to the diameter shown in FIG. 1, the amount of pantographing that would be necessary would be much greater and would create a greater shearing action on the rubber. If the spring were molded to a diameter at its mid-section such as shown in FIG. 3 then the cords in that section as they move inwardly into the lobes to a position against the piston 16 must necessarily pantograph to a greater extent, thus causing a greater shearing action than in a spring which is molded to an intermediate diameter. In effect, by molding the spring to an intermediate diameter the pantographing of the cords in the two opposite directions mentioned above is thus divided so that the maximum amount of required pantographing is less than would be required if the spring were molded either to the diameter shown in FIG. 1 or to that shown in FIG. 3. By such an arrangement there is less chance of failure and more assurance the desired pantographing will be accomplished.

The effective cross sectional area upon which the air pressure works is represented by a circle area having a diameter equal to the distance between the points 19 and 20. These represent the centers of the arcs formed by the looped ends of the tubular wall. The effective area is not the entire cross sectional area of the spring. One way to explain this is to point out that if one were to separately consider the part of the loop radially outward of the point 19 and the part radially inward of point 19, it will be found that a portion of the pressure acting on the first part is actually being taken up in axial tension exerted on the outer cylindrical wall of the diaphragm and, therefore, produces no pressure tending to expand the spring in an axial direction. As to the second part, the pressure acts in a downward direction and this also places tension in the smaller diameter of the spring which in turn tends to pull downward and to expand the spring. Of course, the pressure acts directly on the area just above the piston 16, so that the total pressure is the pressure determined by an area determined by the distance between points 19 and 20 multiplied by the unit pressure in the spring. Whatever the explanation, it is a well known fact that the effective area is as above determined.

If the points 19 and 20 remain spaced apart the same amount during the full operation of the spring throughout its operating range, then the action of the spring is such that the amount of pressure required to deflect the spring different amounts is directly proportional to the amount of deflection. For example, if the pressure required to extend the spring 1" is 500 lbs., then each additional inch of expansion will require an additional 500 lbs. This can be referred to as a uniform spring rate, and the spring shown in FIG. 3 is designed for such a rate.

Generally speaking, however, this uniform spring rate is not desirable. The cross sectional area of the spring should be such that during the normal operation of the spring on relatively smooth roads, the spring will give a relatively soft ride. That is, the spring should permit the wheels of the vehicle to vibrate readily without imparting this movement to the body of the car. However, in the event an obstacle is encountered on the road or the car is driven over a rough road, it may be desirable to change the softness of the spring in order to cope with the changed riding condition. Without changing the air pressure in the spring the spring rate may be changed by decreasing or increasing the effective cross sectional area upon which the pressure acts. Thus, if the points 19 and 20 are moved closer together, the effective area becomes less and the spring becomes softer because the total resisting pressure is less and the obstacle that is struck can deflect the spring without giving too much of a jar to the body of the car. Conversely, if in order to prevent bottoming of the spring it is desired to introduce a greater resistance when an obstacle is encountered, the distance between 19 and 20 can be increased so that the total operating pressure is increased.

Different automobile manufacturers have different requirements as to the type of action desired in an air spring of this kind, and with the construction herein shown it is possible to deliver to the car manufacturer a spring meeting his requirements merely by employing the same tubular wall portion and end plates and providing a different shape for the wall of the cylinder 16. By changing the contour of the outer cylindrical wall of cylinder 16, it is possible to secure many variations in the action of the spring shown in FIG. 3. Some of these are illustrated in FIGS. 4, 5, 6, 7 and 8.

In each of FIGS. 3 to 8 inclusive the positions of the looped ends of the tubular wall are shown in different positions determined by the loading, these positions being shown in dotted lines. The respective spacing of points 19 and 20 is also shown and dotted lines indicate the loci of the points 19 and 20. The distance between the points 19 and 20 will be referred to in the claims as the "mean diameter of the looped portions" of the spring.

Figure 4:
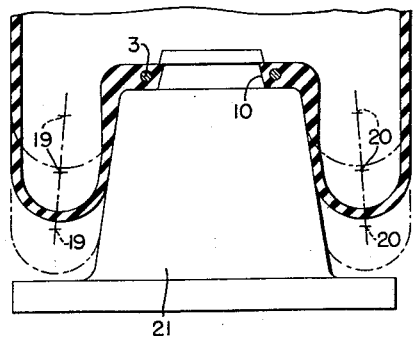
Figure 5:
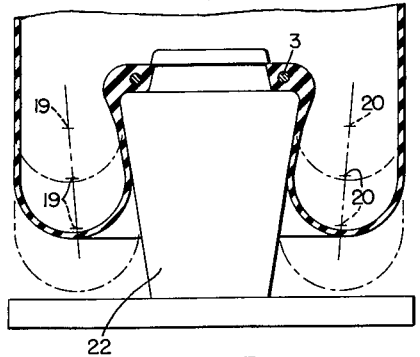
Figure 6:
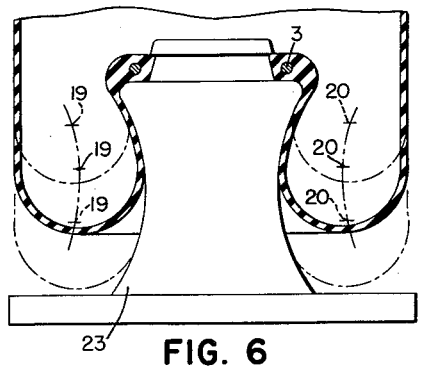
Figure 7:
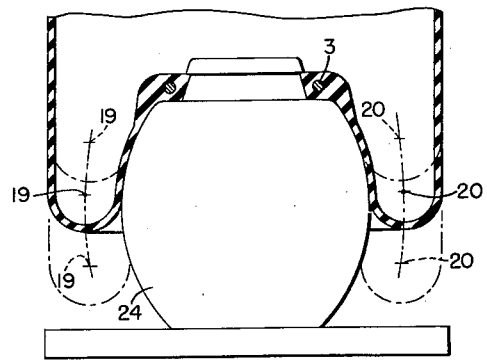

In FIG. 4, the piston 21 corresponding to the piston 16 has a conical outer surface which causes the points 19 and 20 to move outwardly away from each other on increased compression of the spring. FIG. 5 shows a reverse type conical surface on the piston 22 in which the increase of the load on the spring decreases the distance between the points 19 and 20. In FIG. 6, the movement of the points 19 and 20 is such that on either side of the normal loaded position, they move outwardly away from each other so that greater resistance is encountered. This is the result of providing a cylinder which is larger at the ends than at the middle as shown at 23. In FIG. 7, the reverse of FIG. 6 is shown and the pressure becomes less on either side of the normal loaded position, since the outer surface of the piston 24 is larger in diameter at the middle than at the ends thereof. In FIG. 8 an irregular shaped piston 25 is illustrated in which the loci of the points 19 and 20 is an irregular curve so that the effective area changes in a varying degree during the operational movement of the spring.

FIG. 9 illustrates an alternative form of the invention in which instead of providing a single cylinder at one end of the spring two cylinders 26 and 27 are provided on the plates 28 and 29 respectively, these pistons being illustrated as shaped the same as piston 21 in FIG. 4. The mounting for the tubular sleeve 30 is similar to that shown in the other figures and the action is substantially the same as shown in reference to the other figures, except that part of the looping may occur at one end and part at the other as illustrated. However, practical experience has shown that the looping may at times occur with respect to one piston only or with respect to the other only, and this might not be desirable in some constructions. Furthermore, this form of the invention has the objection that where the rubber portion of the tubular wall rolls against the piston 26 there is a possibility that accumulated dirt may remain locked within the space between the tubular wall and the piston 26. This would be undesirable, as it would provide an abrading action on the fabric which would impair the life of the tubular wall. As far as the lower piston 27 is concerned, its position is similar to those shown in the other forms of the invention and any dirt coming between the sleeve and the piston will have a tendency to work out and fall away from the piston so that the chances of any abrading action are greatly minimized.

Without discussing why these different spring actions are desirable, it will be seen that the area upon which the air pressure works can be controlled by the surface of the cylinder which engages the looped ends of the outer wall. In other words, the contour of the piston is used to regulate the spring rate for different positions without changing the tubular wall structure itself.

While not deemed to be absolutely necessary, it is preferable to first lubricate the beads 3 before wrapping the fabric about the beads. This is to reduce friction between the beads and the fabric and to prevent the fabric from adhering to the beads. In turning the lower end of the spring inside out as shown in FIG. 3, there is apt to be some twisting movement of the fabric about the beads, and if the beads are lubricated or free of the fabric, the fabric may turn about the beads freely. A suitable lubricant for this purpose is one of the silicon oils or zinc stearate or some such material having known lubricating qualities. However, it is not absolutely necessary to provide such an arrangement. The beads 3 may be and preferably are solid, inextensible metal rings, but they may be inextensible fibers, wires or the like, either formed as single strands or braided. The essential quality is in having the beads made inextensible to firmly hold the beads in sealed relation to the end walls of the chamber. A smooth, solid ring seems to be the most desirable.

In general, in making springs which are designed to have a smaller outer maximum diameter than 7", the initial angle of the cords shown as 30° in FIG. 1 would be larger. As an example, for a 5½" spring, the initial cord angle would be 38° and the diameter of the tubular wall will be smaller in comparison, but the ultimate cord angle should approximate that of the inflated angle of equilibrium the same as in the spring shown in FIG. 3. The walls of the tubular member should not be made so thick that they offer appreciable resistance to the tendency the cords have to change their angles during expansion of the spring, and the walls of course should be sufficiently flexible so that the lower ends will readily form loops as shown in FIG. 3, etc. without placing undue flexing on the cords or generating too much heat. The cords should preferably be of a material which is highly flexible and of high tensile strength as well as low stretch. In fact, it is preferable that substantially all stress be removed from the cords before the cords are embedded in the spring. Nylon is a preferable material for this purpose, but other materials may be used and even fine stranded steel wire either used as single strands or braided or cabled. These, however, require special treatment in order to secure a proper bond to the rubber, whereas the regular fabric or synthetic cords may be more easily bonded to the rubber without special care. As used in the claims "cords" means any such equivalent tension element and "rubbery material" means, natural or synthetic rubber or any material which has like characteristics for forming a pliable air impervious wall for the chamber.

It is obvious that the spring must be long enough so that there will exist a middle section which remains at a constant diameter for all positions of the piston or pistons. If one were to imagine the spring as being shortened so that the cords may form only the arcuate portions at the ends, then the spring will become a toroidal spring which will operate in the manner of the well-known bellows spring. Such springs change their outer diameter as the load increases or decreases. This cylindrical section is also necessary to permit extended piston movement during normal use of the spring. The invention contemplates an initial length for the spring sufficient to form a cylindrical section of substantial length so that during piston movement at least a portion thereof will remain cylindrical to insure the maximum normal cross-section of the spring for the desired operating conditions previously referred to.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. A compression type air spring comprising end walls and a generally cylindrical flexible outer wall joining said end walls to form an air chamber, said outer wall being provided with a bead at each of the ends thereof and the spring being of the type adapted to be loaded axially of said chamber by generally axially directed forces applied to said end walls, said outer wall being formed of substantially inextensible cords embedded in a vulcanized rubbery material with the cords extending from one end of said flexible wall to the other and there anchored to the beads at the respective ends of said outer wall, the cords being formed in at least two groups arranged at equal but opposite angles with respect to an element of the surface thereof which angles are substantially less than the angle of equilibrium for said cords when the spring is inflated and under load, the rubbery material being flexible and stretchable sufficiently as not to offer appreciable resistance to the pantographing of the cords and thus permit substantial radial enlargement of said chamber by the pantographing of the cords at the mid-section thereof to their angle of equilibrium under load to thereby establish a constant cylindrical diameter at the mid-section with the portions between the mid-section and the beads reversely looped inwardly by the movement of the end walls toward each other under load, and means for controlling the spring rate of said spring comprising a piston adjacent at least one end wall projecting axially outwardly thereof with the radially facing outer wall of said piston providing a surface against which the radially inner portion of the looped portion of the spring will engage to thus control the mean diameter of said looped portion and thus control the spring rate, the radial outer diameter of said mid-section remaining constant due to the cords being at their angle of equilibrium under load.

2. A device as set forth in claim 1 in which the end walls are separate from the cylindrical wall and are releasably connected thereto.

3. A generally tubular compression type fluid spring adapted to be axially loaded, comprising an elongated tubular flexible wall and end walls forming a chamber for fluid under pressure, said end walls being free to move axially toward and from each other under varying spring loads, cords in said tubular wall extending from adjacent one end thereof to adjacent the other end thereof at angles to an element of the tubular wall which are substantially less than their loaded angles of equilibrium and with some of the cords extending at opposite but equal angles to others of said cords, anchoring means adjacent the ends of said tubular member for restraining axial and radial movement of the cords with respect to said anchoring means, the tubular wall incorporating a vulcanized rubbery material to make said tubular wall substantially fluid impervious with said rubbery material being sufficiently yieldable to permit substantially unrestrained pantographing movement of said cords to their loaded angles of equilibrium when the spring contains fluid under pressure and the spring is under load, said cords, under load, remaining at their loaded angles of equilibrium at the mid-section of the spring during normal operation to thus maintain a cylindrical confiuration of fixed diameter for said mid-section, and at least one of the ends of said tubular wall between said mid-section and said anchoring means forming a connecting lobe bulging axially outward with the angles of the cords in said lobes decreasing from their loaded angles of equilibrium at the mid-section toward the radially innermost part of said lobe, and means for controlling the innermost diameter of said lobe under the varying loads imparted to the spring during operation, the diameter of said mid-section during normal operation being determined and maintained by said cords without the use of auxiliary restraining means.

4. A spring as set forth in claim 3 in which the spring has a lobe at only one end thereof and at the other end thereof the connecting portion between the mid-section and said restraining means forms an abutment engaging a portion of the adjacent end wall.

5. A spring as set forth in claim 3 in which both ends of said spring are provided with a lobe as described and in which a separate means is provided for controlling the innermost diameter of each such lobe.

6. A spring as set forth in claim 3 in which the means for controlling the innermost diameter of the lobe comprises an axially extending piston having an external surface against which the lobe engages, said piston being shaped to give the desired effective spring rate a different positions of said end walls with respect to each other.

7. A spring as set forth in claim 3 in which said external surface is contoured to different diameters axially thereof.

8. A spring as set forth in claim 3 in which said external surface is contoured such that it decreases in cross-section axially outward from said end wall.

9. A spring as set forth in claim 3 in which said external surface is contoured such that it increases in cross-section axially outward from said end wall.

10. A spring as set forth in claim 3 in which said external surface is contoured such that it first increases and then decreases in cross-section axially outward from said end wall.

11. A spring as set forth in claim 3 in which said external surface is contoured such that it first increases, then decreases and finally again increases in cross-section axially outward from said end wall.

12. A spring as set forth in claim 3 in which the said surface of the projecting portion is conical at least in part, with the smaller diameter of the conical surface near said end wall.

13. A spring as set forth in claim 3 in which the bead is unbonded to but is enclosed by the end portions of said tubular wall whereby to permit turning movement about the bead.

14. The method of making air springs of the rolling-lobe type herein described comprising the steps of forming an elongated hollow cylinder of at least two layers of unvulcanized rubberized fabric having generally parallel cords with the cords in each layer arranged at predetermined angles to an element of the cylinder which angles are substantially less than their angles of equilibrium when the spring is pressurized and under load, the cords in each of said layers being arranged at substantially the same but opposite angles with respect to said element as the cords in the other of said layers, expanding at least the mid-section of the cylinder so formed to a substantially greater diameter but still substantially less than the ultimate expanded diameter of said spring under load, and vulcanizing the spring while said mid-section is thus expanded whereby the cords are pantographed to greater angles with respect to said element at said mid-section but are still at substantially less than their angles of equilibrium when the spring is pressurized and under load.

15. A spring of the class described comprising a substantially hollow tubular flexible wall formed of vulcanized rubbery material and substantially inextensible reinforcing cords embedded therein, end walls forming with said tubular wall a chamber for receiving a fluid under pressure, substantially inextensible beads embedded in the tubular wall adjacent said end walls, the said cords each extending from a bead adjacent one end wall to the bead adjacent the other end wall and anchored to said beads, the cords having angles of substantially less than 54° to an element of the surface of said tubular wall, with some of said cords arranged at opposite angles to those of others of said cords, the rubbery material of said tubular wall and the angles of said cords permitting substantially uniform expansion of the tubular wall under pressure within said chamber until the cords reach substantially the angle of equilibrium except at the ends thereof where they are restrained by said beads, the outer surface of said tubular member being restrained only by the material of the wall itself, each of said end walls being provided with a portion projecting axially outward from the adjacent end of said tubular wall, and each of said projecting portions having an external surface in position to be engaged by the portion of the tubular wall adjacent thereto when the end walls are moved toward and from each other when the spring is inflated and under load, said external surface of each said axially projecting portion being contoured to give the desired effective spring rate.

16. A spring of the class described comprising a substantially hollow tubular flexible wall formed of vulcanized rubbery material and substantially inextensible reinforcing cords embedded therein, end walls forming with said tubular wall a chamber for receiving a fluid under pressure, substantially inextensible beads embedded in the tubular wall adjacent said end walls, the said cords each extending from a bead adjacent one end wall to the bead adjacent the other end wall and anchored to said beads, the cords having angles of substantially less than 54° to an element of the surface of said tubular wall, with some of said cords arranged at opposite angles to those of others of said cords, the rubbery material of said tubular wall and the angles of said cords permitting substantially uniform expansion of the tubular wall under pressure within said chamber until the cords reach substantially the angle of equilibrium except at the ends thereof where they are restrained by said beads, the outer surface of said tubular member being restrained only by the material of the wall itself at least one of said end walls being provided with a portion projecting axially outward from the adjacent end of said tubular wall, said projecting portion having an external surface in position to be engaged by the portion of the tubular wall adjacent said latter end when the end walls are moved toward and from each other when the spring is inflated and under load, said external surface of said axially projecting portion being contoured to different diameters axially thereof such that the outer diameter of said surface first decreases and then increases in cross-section axially outwardly from said end wall.

17. A spring of the class described comprising a substantially hollow tubular flexible wall formed of vulcanized rubbery material and substantially inextensible reinforcing cords embedded therein, end walls forming with said tubular wall a chamber for receiving a fluid under pressure, substantially inextensible beads embedded in the tubular wall adjacent said end walls, the said cords each extending from a bead adjacent one end wall to the bead adjacent the other end wall and anchored to said beads, the cords having angles of substantially less than 54° to an element of the surface of said tubular wall, with some of said cords arranged at opposite angles to those of others of said cords, the rubber material of said tubular wall and the angles of said cords permitting substantially uniform expansion of the tubular wall under pressure within said chamber until the cords reach substantially the angle of equilibrium except at the ends thereof where they are restrained by said beads, the outer surface of said tubular member being restrained only by the material of the wall itself, at least one of said end walls being provided with a portion projecting axially outward from the adjacent end of said tubular wall, said projecting portion having an external cylindrical surface in position to be engaged by the tubular wall adjacent said latter end when the end walls are moved toward and from each other when the spring is inflated and under load to give the desired spring rate.

References Cited in the file of this patent

UNITED STATES PATENTS

| | | |
|---|---|---|
| Re. 20,887 | Mercier | Oct. 18, 1938 |
| 779,163 | Irwin | Jan. 3, 1905 |
| 971,583 | Bell | Oct. 4, 1910 |
| 1,177,142 | Rudd | Mar. 28, 1916 |
| 1,242,431 | Foster | Oct. 9, 1917 |
| 1,458,532 | Lanchester | June 12, 1923 |
| 1,729,565 | Caretta | Sept. 24, 1929 |
| 1,989,956 | Ulrich | Feb. 5, 1935 |
| 2,182,176 | Maranville | Dec. 5, 1939 |
| 2,208,540 | Brown | July 16, 1940 |
| 2,257,913 | Maranville | Oct. 7, 1941 |
| 2,776,830 | Gouirand | Jan. 8, 1957 |
| 2,787,312 | Servaes | Apr. 2, 1957 |
| 2,901,242 | Elliott et al. | Aug. 25, 1959 |
| 2,906,314 | Trevaskis | Sept. 29, 1959 |
| 2,920,885 | Niclas | Jan. 12, 1960 |
| 2,950,104 | Bowser et al. | Aug. 23, 1960 |

FOREIGN PATENTS

| | | |
|---|---|---|
| 21,732 | Great Britain | Sept. 24, 1912 |
| 400,616 | Great Britain | Oct. 24, 1933 |